Feb. 12, 1935.  H. GEERY  1,990,938
FAUCET
Filed July 22, 1933   2 Sheets-Sheet 1
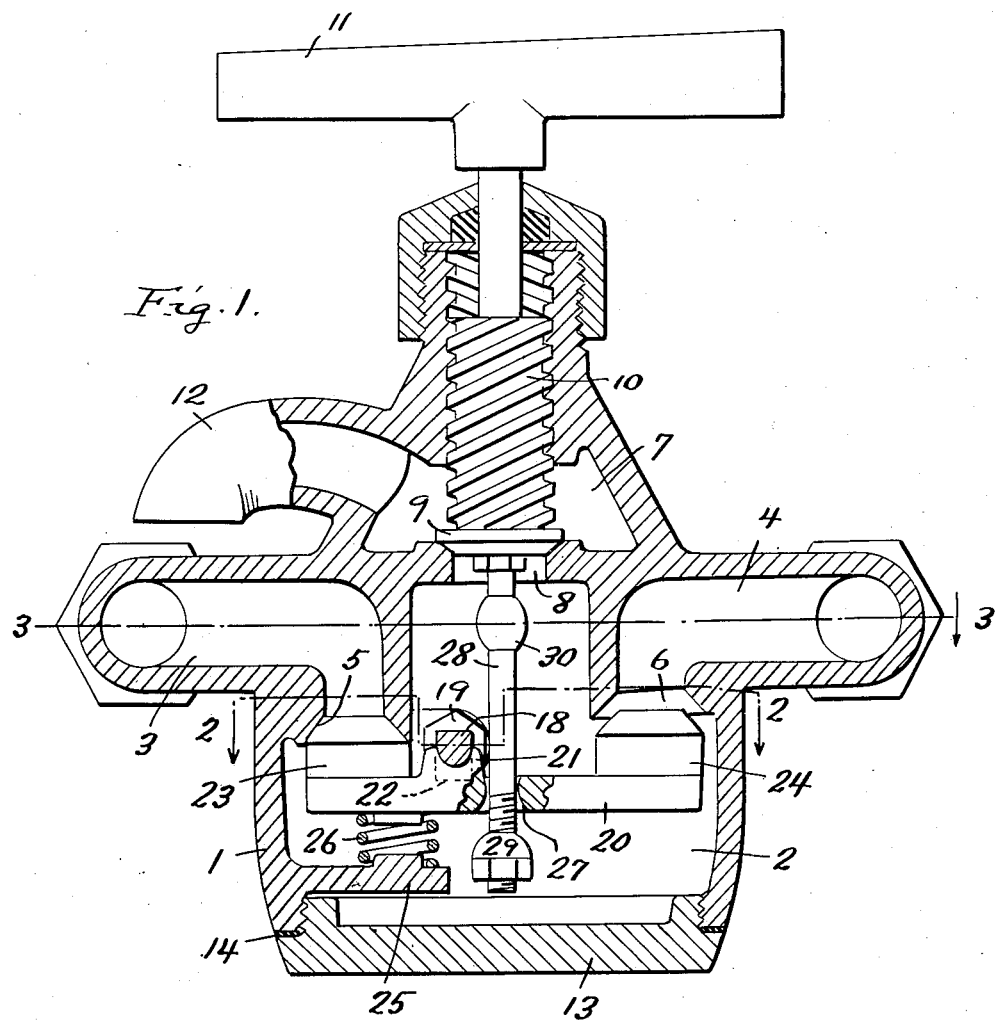
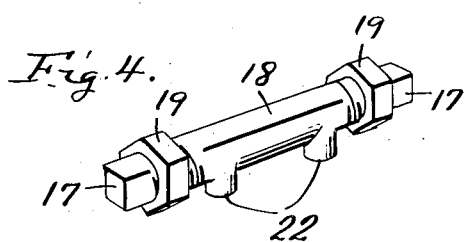
Inventor
Harvey Geery
By *Clarence A. O'Brien*
Attorney Feb. 12, 1935.  H. GEERY  1,990,938
FAUCET
Filed July 22, 1933   2 Sheets-Sheet 2

Inventor
Harvey Geery
By Clarence A. O'Brien
Attorney

Patented Feb. 12, 1935

1,990,938

UNITED STATES PATENT OFFICE 1,990,938

FAUCET

Harvey Geery, Modesto, Calif.

Application July 22, 1933, Serial No. 681,782

3 Claims. (Cl. 277—18)

The present invention relates to new and useful improvements in faucets, particularly hot and cold water faucets, and has for one of its important objects to provide, in a manner as hereinafter set forth, a faucet of this character embodying the novel construction, combination and arrangement of parts through a medium of which water of any desired temperature may be had by operating a single handle.

Other objects of the invention are to provide a faucet of the character described which will be simple in construction, strong, durable, highly efficient and reliable in use, compact, attractive in appearance and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:—

Figure 1 is a view principally in vertical section through a faucet constructed in accordance with the present invention.

Figure 4 is a detail view in perspective of the fulcrum.

Figures 2, 3:
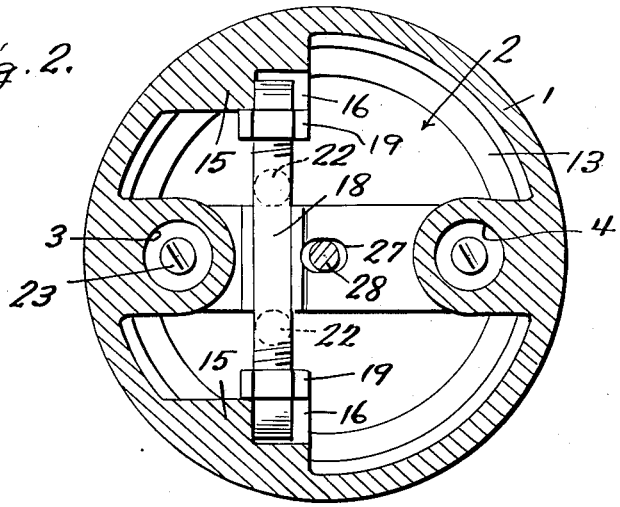
Figure 2 is a view in horizontal section through the faucet, taken substantially on the line 2—2 of Figure 1.
Figure 3 is a horizontal sectional view, taken substantially on the line 3—3 of Figure 1.

Referring now to the drawings in detail, it will be seen that the embodiment of the invention which has been illustrated comprises a casing 1 which is formed to provide a mixing chamber 2 with which hot and cold water inlet passages 3 and 4, respectively, communicate. At their inner ends, the inlet passages 3 and 4 terminate in valve seats 5 and 6, respectively. The upper portion of the casing 1 is formed to provide a chamber 7 which communicates with the mixing chamber 2 through a passage 8, said passage 8 being controlled by a valve 9 on the lower end of a stem 10 which is threaded for vertical adjustment in said casing 1. The stem 10 is actuated by a handle 11 on its upper end. Communicating with the chamber 7 is a discharge spout 12. A removable plate 13 constitutes the bottom of the casing 1, a gasket 14 being provided between said plate and casing to prevent leakage.

As illustrated to advantage in Figure 2 of the drawings, the lower portion of the casing 1 has formed therein protuberances 15 which extend into the mixing chamber 2, said protuberances having polygonal recesses 16 therein for the reception of the square end portions 17 of a fulcrum 18. Adjacent the square end portions 17 the fulcrum 18 is provided with threaded portions upon which securing nuts 19 are mounted. The nuts 19 are engageable with the opposed faces of the protuberances 15 for securing the fulcrum 18 in position.

The reference numeral 20 designates a rocker arm having a bearing 21 on an intermediate portion thereof for engagement beneath the fulcrum 18. Stops 22 depend from the fulcrum 18 to retain the rocker arm 20 against lateral movement.

Valves 23 and 24 are mounted on the end portions of the rocker arm 20 for engagement with the seats 5 and 6 for controlling the inlet passages 3 and 4. It will be noted that the seat 6 is disposed at an inclination to compensate for the arc described by the rocker arm 20 as it swings on the fulcrum 18. It will also be noted that the bearing 21 is closer to one end of the rocker arm 20 than to the other end of said rocker arm.

Projecting into the mixing chamber 2 from the casing 1 is an integral bracket 25. A coil spring 26 is mounted between the bracket 25 and the rocker arm 20 for yieldingly urging the valve 23 toward its seat 5. The rocker arm 20 has formed therein an opening 27 which accommodates a rod 28 which depends from the valve 9. Adjustably mounted on the lower end portion of the rod 28 for engagement with the rocker arm 20 is a head 29. It will thus be seen that after the valve 9 has been raised a predetermined distance from its seat the head 29 will engage and actuate the rocker arm 20 against the tension of the coil spring 26 for moving the valve 24 toward its seat 6 and for moving the valve 23 away from its seat 5. On its upper portion the rod 28 has formed thereon an enlargement constituting a spreader 30 which is raised into or slightly above the passage 8 when the valve 9 is substantially in fully opened position.

Briefly, the operation of the faucet is as follows:—

As seen in Figure 1 of the drawings, when the valve 9 is closed, the hot water valve 23 is also closed but the cold water valve 24 is open. It will thus be seen that the chamber 2 is normally filled with cold water. The tension of the spring 26 is sufficient to normally maintain the valve 23 in closed position. When the valve 9 is raised by turning the handle 11 cold water will flow from the discharge spout 12. As the opening of the valve 9 is continued the head 29 engages and actuates the rocker arm 20 against the tension of the spring 26, thus moving the valve 24 toward closed position and simultaneously opening the valve 23, as hereinbefore explained. Hot water from the inlet passage 3 then passes into the chamber 2 where it is mixed with the cold water, the mixed hot and cold water then passing through the passage 8, through the chamber 7 and out through the spout 12, as will be apparent. It will thus be seen that by adjusting the handle 11 the proportions of hot and cold water admitted to the chamber 2 may be varied as desired. It will further be seen that by closing the valve 24 and opening the valve 23 only hot water will be admitted to the chamber 2 and, of course, if cold water is desired the valve 24 is permitted to remain open and the valve 23 closed. To shut off the flow of water from the discharge spout 12 the valve 9 is closed, as will be obvious.

It is believed that the many advantages of a faucet constructed in accordance with the present invention will be readily understood, and although the preferred embodiment of the invention is as illustrated and described, it is to be understood that changes in the details of construction and in the combination and arrangement of parts may be resorted to which will fall within the scope of the invention as claimed.

What is claimed is:—

1. A faucet comprising a casing having a chamber therein, a pair of oppositely arranged inlet members depending into the chamber and having valve seats at their lower ends, the top of the casing having an outlet in communication with the upper part of the chamber, a fulcrum bar located in the chamber adjacent one of the inlet members, a valve carrying bar having an upwardly extending portion provided with a recess receiving a portion of the fulcrum bar, a valve at each end of the valve carrying bar for engaging the seats, the recessed projection being located between one valve and the central portion of the valve carrying bar, said central portion of the bar having an opening therein, a valve for closing the outlet opening and having a depending stem passing through the opening in the valve bar, an adjustable head on the lower end of the stem for engaging the valve bar to rock the same, means for operating the outlet valve, and a spring in the chamber engaging the valve bar at a point outwardly from the recessed projection, to hold one valve on its seat and the other valve off its seat.

2. A faucet of the class described comprising a casing having a chamber therein and oppositely arranged inlet members having their lower ends depending into the chamber and each lower end having a valve seat formed therein, the lower end of one member being located below the plane of the lower end of the other member, a fulcrum bar located in the chamber and located adjacent the member which extends farthest into the casing, a valve bar having an upstanding projection thereon formed with a recess for receiving part of the fulcrum bar, upwardly extending valves carried by the end portions of the valve bar for engaging the valve seats, the central portion of the valve bar having an opening therein and the recessed projection being located between said opening and that valve which engages the low seat, the top part of the casing having an outlet opening therein, a valve for closing said opening and provided with a depending stem which passes through the hole in the valve bar, the lower end of the stem having a head thereon for engaging the valve bar for rocking the same upon the fulcrum bar, a spring engaging the valve bar for holding the valve which engages the low seat in contact with said seat and the other valve off its seat, and means for opening the outlet valve and for raising the stem to cause the head to engage the valve bar to rock the same upon the fulcrum bar.

3. A faucet of the class described comprising a casing having a chamber therein and oppositely arranged inlet members having their lower ends depending into the chamber and each lower end having a valve seat formed therein, the lower end of one member being located below the plane of the lower end of the other member, a fulcrum bar located in the chamber and located adjacent the member which extends farthest into the casing, a valve bar having an upstanding projection thereon formed with a recess for receiving part of the fulcrum bar, upwardly extending valves carried by the end portions of the valve bar for engaging the valve seats, the central portion of the valve bar having an opening therein and the recessed projection being located between said opening and that valve which engages the low seat, the top part of the casing having an outlet opening therein, a valve for closing said opening and provided with a depending stem which passes through the hole in the valve bar, the lower end of the stem having a head thereon for engaging the valve bar for rocking the same upon the fulcrum bar, a spring engaging the valve bar for holding the valve which engages the low seat in contact with said seat and the other valve off its seat, means for opening the outlet valve and for raising the stem to cause the head to engage the valve bar to rock the same upon the fulcrum bar, the chamber having notched projections on its walls, the notches of which receive the ends of the fulcrum bar, means for holding the fulcrum bar in position with its ends engaging the notches, and depending projections on the fulcrum bar, one on each side of the recessed projection on the valve bar.

HARVEY GEERY.